US011833683B2

(12) United States Patent
Biehle et al.

(10) Patent No.: US 11,833,683 B2
(45) Date of Patent: Dec. 5, 2023

(54) ITEM GRIPPING DEVICE WITH INTRINSIC ITEM ORIENTING ATTRIBUTES

(71) Applicants: Allen P Biehle, Katy, TX (US); Martin C Biehle, Bellville, TX (US)

(72) Inventors: Allen P Biehle, Katy, TX (US); Martin C Biehle, Bellville, TX (US)

( * ) Notice: Subject to any disclaimer, the term of this patent is extended or adjusted under 35 U.S.C. 154(b) by 0 days.

(21) Appl. No.: 17/134,260

(22) Filed: Dec. 26, 2020

(65) Prior Publication Data

US 2022/0203525 A1 Jun. 30, 2022

(51) Int. Cl.
*B25J 9/16* (2006.01)
*B25J 15/02* (2006.01)
*B25J 13/08* (2006.01)
*B25J 9/00* (2006.01)

(52) U.S. Cl.
CPC ........... *B25J 9/1612* (2013.01); *B25J 9/0096* (2013.01); *B25J 9/1697* (2013.01); *B25J 13/08* (2013.01); *B25J 15/0253* (2013.01)

(58) Field of Classification Search
CPC ...... B25J 9/1612; B25J 9/0096; B25J 9/1697; B25J 13/08; B25J 15/0253; B25J 15/0033; B25J 15/08; G05B 2219/39487; G05B 2219/40053
See application file for complete search history.

(56) References Cited

U.S. PATENT DOCUMENTS

| 4,699,414 A * | 10/1987 | Jones | B25J 15/026 294/902 |
| 8,011,708 B2 * | 9/2011 | Becker | B25J 9/142 294/196 |
| 10,981,272 B1 * | 4/2021 | Nagarajan | B25J 9/1669 |
| 2019/0308822 A1 * | 10/2019 | Struijk | A01G 9/143 |

* cited by examiner

*Primary Examiner* — Jeff A Burke
*Assistant Examiner* — Blake A Wood

(57) ABSTRACT

A gripping assembly for use with an automated sorting or manufacturing assembly is disclosed. The gripping assembly includes two or more fingers and alignment attributes for precisely picking up objects (e.g., objects placed in a random orientation). The gripping assembly includes the intrinsic ability to retrieve and align objects predictably by including fingers machined to specific characteristics, such that when roughly located to pick up the object, the closing of the fingers orients the object precisely allowing further manipulation of the object from a known object orientation. The fingers of the device can be aligned with precision using optional alignment features such as sliding within tabs fixed to one finger or sliding along a stabilizing pin fixed to one finger.

17 Claims, 17 Drawing Sheets

ITEM GRIPPING DEVICE WITH INTRINSIC ITEM ORIENTING ATTRIBUTES

CROSS-REFERENCE TO RELATED APPLICATIONS

The present application claims priority to U.S. Provisional Application No. 62/954,535, filed Dec. 29, 2019, entitled, "ITEM GRIPPING ASSEMBLY WITH INTRINSIC ITEM ORIENTING ATTRIBUTES," by the same inventors, which is incorporated by reference herein, in its entirety.

TECHNICAL FIELD

This disclosure is directed toward the automation of item gripping or part selection where the item is gripped and precisely retrieved through automated, computer assisted, or computer controlled manipulation devices and placed or handled based on a specific orientation or placement.

BACKGROUND

Over the past decade the ability of process automation has quickly improved due to cost improvements in machinery, robotics, automation equipment, and other technology related to material handling processes. The ability to efficiently handle items has quickly become a differentiator when it comes to manufacturing, processing, inspections, assembly, and related fields. Eliminating extra steps related to item gripping, orientation, or re-positioning represents a possible improvement and cost saving advantage across numerous industries.

Disclosed examples and embodiments of an item gripping assembly with intrinsic item orienting attributes address the above referenced problems and represent possible improvements to the technology field of robotic assembly. Additionally, the disclosed examples may be applied to other areas of automation where sorting and orienting of parts is an aspect of the automation.

BRIEF DESCRIPTION OF THE DRAWINGS

For a detailed understanding of various examples, accompanying drawings are provided. The following figures form part of the present specification and are included to further demonstrate certain aspects of the present claimed subject matter. These figures are examples that are not necessarily drawn to scale and should not be used to limit or restrict the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings. Additionally, like reference numerals in the drawings identify identical or substantially similar elements, wherein:

DETAILED DESCRIPTION

Figure 1:
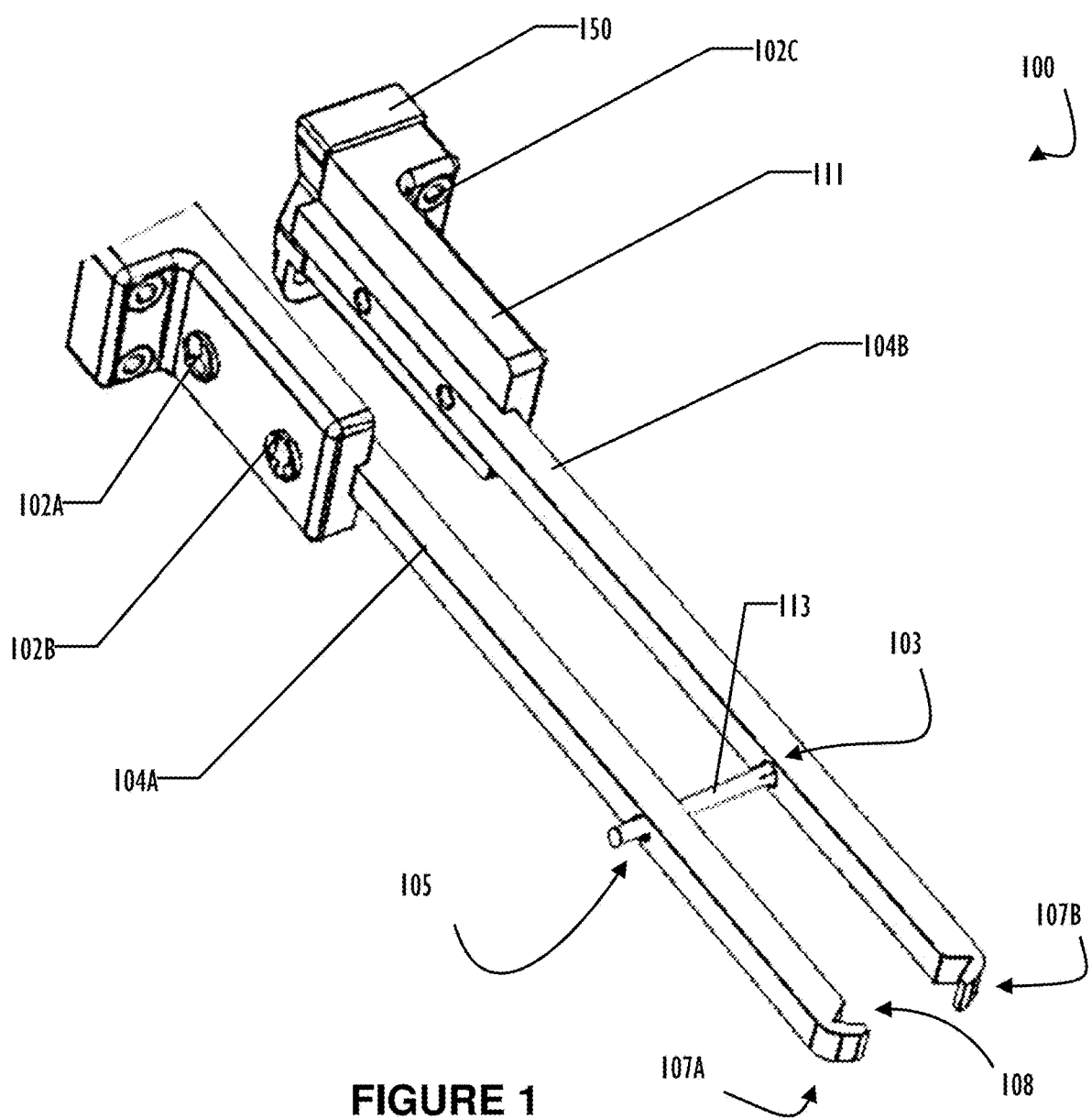
FIG. 1 illustrates one example of a gripping assembly mounted to a manipulation device with retrieval fingers mounted to stabilizing blocks, and includes an optional precision alignment component as part of the retrieval and orienting fingers, according to disclosed techniques.

Certain terms are used throughout the following description and claims to refer to particular components, configurations of components, and functions provided by people/service providers/computers/networks. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ."

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form to avoid obscuring the disclosed embodiments. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The scope of the invention is defined by the appended claims and equivalents thereof. Illustrative embodiments of the invention are described below. In the interest of clarity, not all features of an actual implementation are described in every embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. As understood by those skilled in the art, elements in flow charts may be performed in the order shown or may be performed in an order different than shown to achieve the same or a similar result.

Part selection in automated or computer system controlled equipment is an ongoing challenge which presents challenges across many industries such as Oil & Gas, Utilities, Manufacturing, and Retail. The ability to pick items such as pins, nails, screws, cylindrical parts, dowels, pipes, rods, connectors, or shafts can greatly reduce the cost associated with the manufacturing, processing, inspection, or assembly of these items.

Furthermore, the automation of work operations involving retrieval and subsequent treatment, placing, assembly, or packaging of items may be desirable in virtually all industries. These operations rely on the precise delivery of each item to a known and consistent dimensional coordinate, such as items in ammo, tape, or reel carriers, which can be part of an item delivery system. Item delivery systems, such as feed mechanisms, conveyors, or bin drops, as discussed herein typically allow an item to be automatically retrieved for processing using a three-dimensional coordinate location system.

The task of retrieving items that are not easily presented in a known three-dimension coordinate space is much more difficult. For example, items are often packaged in bulk without an organized carrier, such as in a box, bag, or tube. Using previously available techniques, preparing items in this form of packaging for automated processing may have involved one or more manual steps of sorting, orienting, and placing items in an organized manner. Specifically, a worker would place singularized items into a system that can then deliver the items to a known coordinate and position for retrieval by an automation system.

Use of disclosed techniques and apparatus embodiments may enable an automated process to reliably and accurately retrieve items that have been delivered in disorganized or random manner as is consistent with bulk packaging. Thus, gripping assemblies in accordance with this disclosure may greatly reduce or eliminate any manual labor required for the processing of these items. Specifically, it may eliminate the above-referenced pre-processing to organize an item instance from a plurality of instances of that item delivered in a bulk package format.

Having identified the above area of need, some terminology that will be used to help describe the examples of this disclosure is presented. Following the terminology discussion, example embodiments will be provided and explained using the accompanying FIGS. of this disclosure.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "material" refers to one or more physical elements used in the creation of the gripping device. Embodiment examples include aluminum, steel, stainless steel, plastic, ceramic, compounds, and/or composites.

As used herein, the term "item" refers to one or more physical pieces, parts, or assemblies. Embodiment examples include screws, pins, pipes, spools, or other components used in an automated assembly or sorting process. In some cases, an item may have a specific orientation in a vertical, horizontal, or rotational dimension.

For example, a common nail has a head at one end and a point at the other. The common nail does not usually have a rotational dimension as it is consistently shaped around its circumferential perimeter when held vertically. Thus, to pick and place a nail only the head and/or point would require identification and orientation for a place operation would only have to account for the item's vertical orientation.

Other items, that have a more complex shape, may also have a rotational component to their shape such that a pick and place operation for that type of item may include a determination of the item's rotational orientation after the pick operation. Prior to placing the more complex item a rotation of the item may also be implemented and performed by the disclosed gripping assembly. Alternatively, the rotational orientation may be accounted for as part of the pick operation such that the item is picked in a manner consistent with the required place orientation.

As used herein, the terms "orienting attributes" or "orienting attribute" refer to an aspect of the fingers, such as a groove, angular channel, square channel, concave or cylindrical indention, convex or cylindrical protrusion, or other shape intended to precisely guide an item into position when gripping from two or more sides. For example, the orientation may occur as part of the "grasp" action performed by the fingers as part of a "pick operation" when obtaining a single instance of an item from the pick operation. In most examples, the orienting attributes are associated with a distal end of the fingers (relative to the manipulation device). Orienting attributes may be designed based upon one or more attributes of an item to be picked. Embodiment examples of orienting attributes include fingers with: V-shaped grooves, angular channels, square channels, cylindrical indentions, or cylindrical protrusions that may be matched to the physical attributes of an item such that they assist in the gripping and alignment of the item.

As used herein, the term "manipulation device" refers to a mechanical device intended to move or control the movement of the gripping assembly. For example, some manipulation devices may orient and control the "fingers" of the gripping assembly by manipulating (moving) the gripping assembly into an orientation and collapsing the fingers to grasp an item. Embodiment examples include robots, robotic arms, computer system controlled mechanical assemblies, or other devices intended to be used in conjunction with picking, selection, placement, inspection, movement, or gripping of an item.

As used herein, the terms "finger" or "fingers" refers to the piece or pieces of material shaped such that it allows for mounting to a mounting block or directly to a manipulation device and, in different embodiments disclosed herein, has at least one orienting attribute. Embodiment examples are shown throughout the figures and an example is illustrated in FIG. 1.

As used herein, the terms "item gripping assembly", "gripper", or "gripping assembly" refers to the combination of fingers with orienting attributes that are mounted on a manipulation device either directly or with the use of an optional mounting block.

As used herein, the terms "precision guide" refers to the addition of one or more of the of the following: alignment pin, grooves in adjacent surfaces of the fingers, channels in adjacent surfaces of the fingers, angled alignment attributes on the tip of the fingers, or alignment guides attached to the mounting block or the manipulation device. In particular, a precision guide may assist in more precisely aligning fingers to each other as they are collapsed in a grasping stage of a pick operation.

As outlined above, the present disclosure relates to an item gripping assembly that includes gripping and aligning components forming an overall assembly that has a capability to grip and align work-piece items that may be randomly placed in a pre-defined area. The item orienting capabilities, in disclosed examples, is a result of a) a shape to create an orientation attribute for the gripping members and/or b) the precision alignment of the gripping assembly. The orientation attribute may be provided by a multitude of different shapes working together to provide an overall shape for the operative portion of the finger that interacts with the item.

The precision alignment may be provided or assisted by precision guides that are integrated into the item gripping assembly. As disclosed herein, the gripping assembly has applicability in automated assembly and process automation. In particular; disclosed examples may be of benefit where randomly placed items must be reliably identified, gripped, and positioned in item processing tasks. The intrinsic orienting of the gripped item (as provided by the disclosed gripping assembly having at least one orientation attribute) may improve efficiency of automated processes such as gripping, placement, arrangement, assembly, inspection, insertion, and removal of the item.

While the examples of this disclosure are explained from the context of an apparatus designed for item gripping, it will be apparent to one skilled in the art, having benefit of this disclosure, that in the general case the item gripping assembly with intrinsic item orienting attributes can be used with other implementations utilizing automated item gripping. It is therefore understood that the gripping assembly with intrinsic item orienting attributes may be used for purposes other than those specifically explained in the examples herein. Other uses may include, but not be limited to, robotic end-effectors, manually guided part picking equipment, computer system controlled or guided equipment, vision guided gripping, artificial intelligence guided item gripping, and machine learning guided item gripping. Accordingly, it is envisioned that techniques described herein may be applicable to many kinds of item gripping in addition to automated item picking and gripping.

The incorporation of a self-aligning gripping mechanism may provide improvements in item handling across a wide variety of items and types of machinery. A gripper having intrinsic orientation, such as that provided by the disclosed orientation attributes, may be useful to reduce (or eliminate) the need for singulated part presentation at a particular phase in manufacturing and assembly. This singulated part presentation may be automated, in part, by allowing items to be picked by automated robot or computer system in combination with a vision system, 3D vision system, laser detection system, other item location detection device, or by providing a known coordinate or position. Thus, using disclosed techniques and apparatus, a singular part from many parts may be selected automatically at any given phase of an assembly or manufacturing process.

Disclosed examples have many possible implementations that may be specifically useful where the item retrieval and orienting feature is implemented in a variety of ways or combination thereof. For example, the orienting channel shape may be modified to properly align a variety of items of varying shapes. These items and shapes may include cylindrical shapes, tapered rods, washers, screws, tubes, balls, torus, or the like. The nature of this disclosed technique is not limited in size such that it may only function with small items, such as screws, pins, nails, or pegs. Disclosed techniques are also applicable to large items, such as pipeline sections (e.g., for oilfield drilling or downstream production), pillars, or spools. As is understood in the art of construction, manufacturing, or industrial processing, many large components may require precision retrieval and orientation.

The item gripping assembly with intrinsic item orienting attributes may be used to simplify gripping an item where the gripped item's position and orientation is important. At the same time, it may be desirable for the gripping of the item to not require a precise approach to the item to be gripped. By creating intrinsic orienting attributes on the gripping assembly, such as that disclosed herein, an item may be securely and precisely gripped using the orienting attributes of the gripping assembly. This use of the intrinsic orienting attributes may allow for a reduction in the amount of tooling for distinct items and reduce the need for precise item placement prior to gripping.

According to one embodiment of the present disclosure, a gripping assembly includes a combination of fingers that each have one or more orienting attributes. These fingers may or may not have integrated mounting features. The fingers may be attached to a manipulation device either directly or via an optional mounting block.

As briefly mentioned above, the examples of this disclosure are directed to automated item selection and gripping. However, it should be understood that the need for gripping an item is a common objective where loose items need to be moved. Accordingly, the disclosed embodiments and the gripping assembly proposed may have applications in a wide range of industries for a wide range of item types.

Turning now to the FIGS., FIG. 1 illustrates a first embodiment of the disclosed gripping assembly as gripping assembly 100. In FIG. 1, there is a portion of a manipulation device mount point 150 illustrated and each of right finger 104A and left finger 104B are attached thereto. In this example, each of fingers 104A-B are attached to manipulation device mount point 150 using a respective mounting block 111. The attachment of the fingers 104A-B to respective mounting blocks 111 utilize screws 102A and 102B. The attachment of mounting blocks 111 to manipulation device mount point 150 similarly uses screws with a representative screw 102C illustrated for left finger 104B. Although screws are used in this example, other attachment means (e.g., bolts, glues, welds, etc.) for component parts are also possible. Alternatively, or in addition, some of the components illustrated in FIG. 1 could be combined into a single integrated component.

Note that each "side" of gripping apparatus assembly 100 is substantially a mirror image of the other side. Certain portions of the assembly are not mirror imaged and will be discussed in more detail below. Specifically, precision guide components illustrated as precision pin 113, precision guide hole 105, and precision mount point 103 are not mirror image components.

At each end of left finger 104B and right finger 104A are retrieval ends 107B and 107A, respectively. As illustrated in this example, the retrieval portion of the fingers 104A-B are formed into a characteristic shape that represents an element of the intrinsic orientation capability (i.e., an orientation attribute) of gripping assembly 100. In this example the characteristic shape comprises beveled ends that include a V-notch 108 for each of retrieval ends 107A-B. When closed (i.e., collapsed by manipulation device as part of a grasp operation), retrieval end 107A will "mate" with retrieval end 107B and at their union will be an orifice for grasping an item (not shown). If the item has a shape that will conform to the shape of the orifice (in this example a diamond shaped orifice formed from each V-notch 108 when mated), then the item will naturally align itself with that orifice and be in a known orientation (at least a partially known orientation) after a successful pick operation.

As should be clear, the beveled retrieval ends 107A-B have a shape that allows for targeted item instance retrieval from a surface (i.e., a singular item picked from several on the surface). This shape also allows the item to be drawn into the angular channels that form the orifice upon mating (closure) of each finger 104A-B when the fingers 104A-B are drawn together. As will be explained later, positioning above a singularly identified item instance may be performed by a robotic arm and optical camera that function cooperatively with a manipulation device via manipulation device mount point 150 and in turn gripping assembly 100. An example of a manipulation device will be explained below with reference to FIG. 3.

In the example of FIG. 1, gripping assembly 100 includes a pair of mounting blocks 111 that function to increase stability and ensure alignment for a respective one of fingers 104A-B. Mounting blocks 111 are intended to maintain a stable and parallel set of fingers 104A-B. However, it has been recognized that additional precision may be desired to increase the alignment of the grasping function. This increased alignment may be a benefit where longer fingers are desired in addition to maintaining precise alignment ability over extended periods of use (e.g., withstand usage wear and tear). To accomplish this goal, the inventors have recognized that precision guide components may be beneficial.

In gripping assembly 100, right finger 104A includes precision guide hole 105 that has precision pin 113 passing therethrough. Precision pin 113 is fixed to left finger 104B at mount point 103 by any suitable means. Thus, in operation, while finger 104B approaches finger 104A, precision pin 113 provides precise alignment by passing into and through precision guide hole 105.

In some cases, precision pin 113 (and/or precision guide hole 105) may be tapered to provide alignment while the grasping operation takes place. That is, at the beginning of a grasp (pick) operation, the exact alignment of fingers 104A-B may not be important or even intended. However, upon completion of closure between the fingers 104A-B the alignment is as precise as that defined by precision pin 113 working with precision guide hole 105. This lack of tolerance throughout the closure operation may assist in the intrinsic orientation property of gripping assembly 100. The exactness of the tolerance at the end of the closure operation maintains overall accuracy of operation. Thus, this aspect of varying degrees of expected alignment between fingers may provide for additional benefits for disclosed embodiments. By way of example, the "play" allowed in each of fingers 104A-B allows the item to "self-align" while it is being grasped because the respective shape of the orifice and the external shape of the item will tend to become aligned with each other.

In addition to the above precision improvements, some additional improvements for precision that are not illustrated in gripping assembly 100 may include one or more of: grooves in the fingers, channels in the fingers, angled alignment attributes on the tip of the fingers, or alignment brackets attached to the mounting block or the manipulation device. Some of these improvements are illustrated in examples discussed below.

Figure 2:
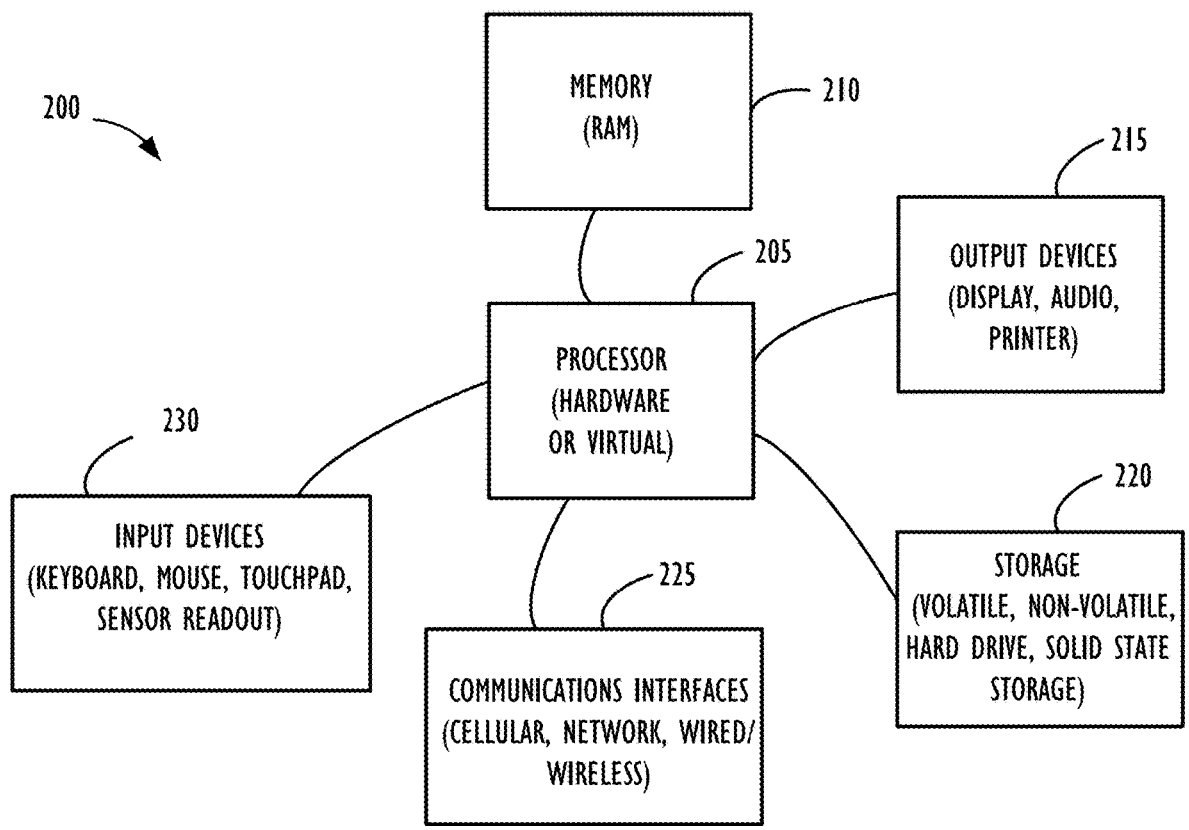
FIG. 2 illustrates a high-level block diagram of a processing device (computing system) that may be used to implement one or more disclosed examples of an automated item gripping assembly in operation.

Referring now to FIG. 2, example computing device 200 is shown. One or more example computing devices 200 may be included in a tablet, cellular phone, laptop, mainframe, or other type of distributed computer (none of which are explicitly shown). Example computing device 200 comprises a programmable control device illustrated as processor 205 that may be optionally connected to input devices 230 (e.g., keyboard, mouse, touch screen, etc.), output devices 215 may include a display, audio, or a printer. Storage 220 may be provided in the form of a program storage device (PSD) (sometimes referred to as a direct access storage device DASD, or solid state "flash" storage memory). Memory 210 may also be communicatively coupled to processor 205 and include, for example, random access memory RAM. Also, included with processor 205 is communications interface 225 for communication via a network (e.g., TCPIP, Cellular, Bluetooth, etc.) with other computing and corporate infrastructure devices (not shown). Note communications interface 225 may be included within processor 205 or be external to processor 205. In either case, a programmable control device such as processor 205 will be communicatively coupled to communications interface 225. Also note, a program storage device for storage 220 represents any form of non-volatile storage including, but not limited to, all forms of optical and magnetic storage elements including solid-state storage.

Program control devices such as processor 205 may be included in a computing device and be programmed to perform methods in accordance with this disclosure. A program control device may itself comprise processor unit (PU), input-output (I/O) interface, and memory. A processing unit may include any programmable control device including, for example, processors of an IBM mainframe (such as a quad-core z10 mainframe microprocessor). Alternatively, in non-mainframe systems examples of a processing unit include the Apple processors from Apple Computer Corporation, Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory may include one or more memory modules and comprise random access memory (RAM), read only memory (ROM), programmable read only memory (PROM), programmable read-write memory, and solid state memory. One of ordinary skill in the art will also recognize that a PU may also include some internal memory including, for example, cache memory. Also, one of ordinary skill in the art will recognize that virtual implementations of the above hardware are also possible on other physical hardware configured to emulate the actions of physical hardware consistent with a program control device. Virtual implementations are often found in Cloud based systems hosted on the Internet.

Aspects of the embodiments are described as a method of control or manipulation of data and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form that is non-transitory and is readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

Figure 3:
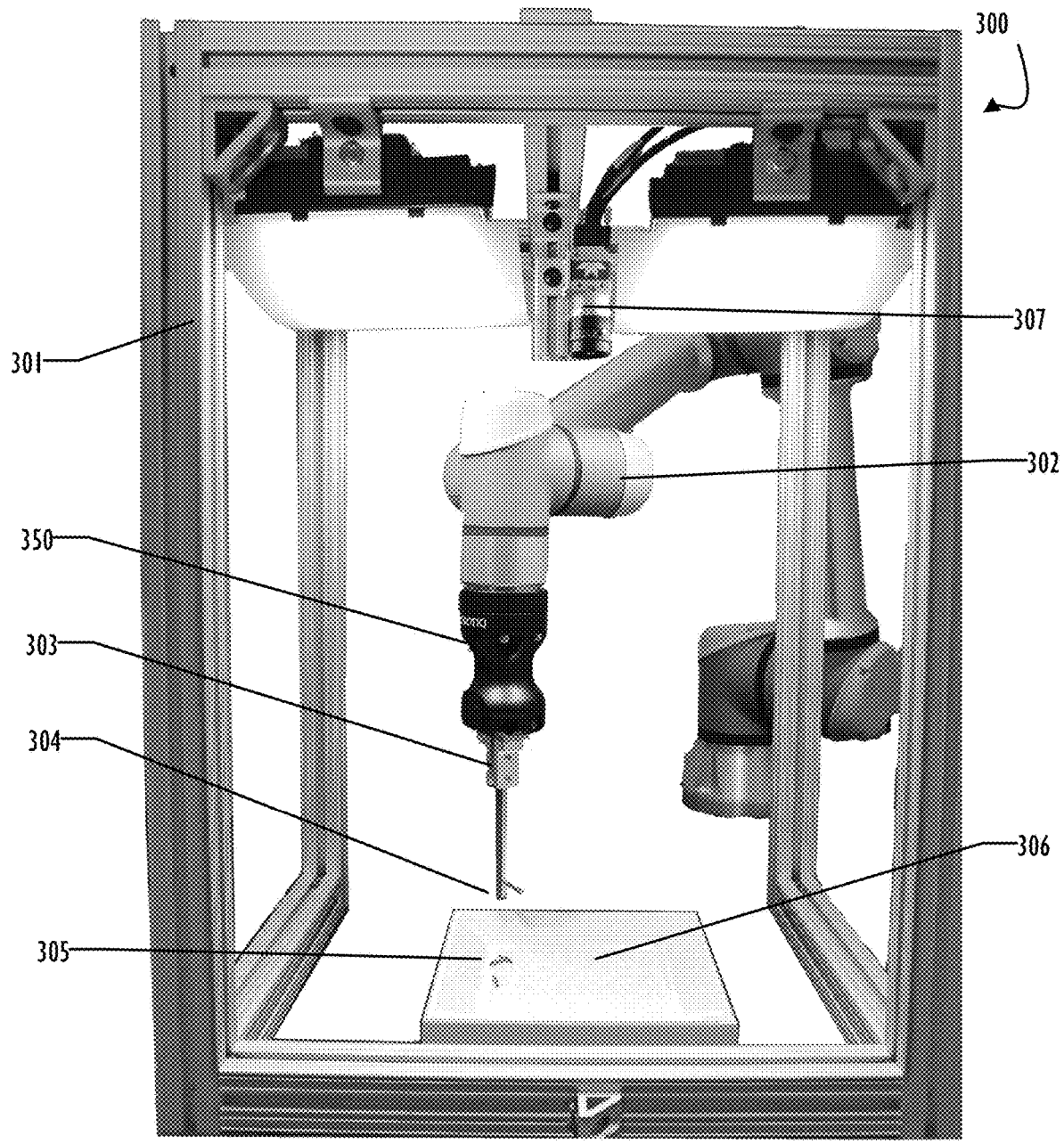
FIG. 3 illustrates an apparatus that incorporates one example of the disclosed item gripping assembly (e.g., from FIG. 1), according to one or more disclosed examples.

Referring now to FIG. 3, an example of a gripping assembly such as gripping assembly 100 is illustrated in the context of a fully configured apparatus 300. Apparatus 300 includes an outer mounting frame 301 that includes, in this example, two sides, a front, and a top. In this example, mounting frame 301 does not have a back, or a bottom. In this example, robotic arm 302 may enter a work area inside mounting frame 301 via the open back. Apparatus 300 further includes a camera 307 which represents one of many possible forms of optical devices (or sensor devices) that may determine a position and/or orientation of multiple items 305 dispersed on work tray 306. This dispersion pattern may be random and specific locations of a target item (i.e., single instance of multiple items 305) may be determined using a combination of camera 307, a positioning grid on work tray 306, or other means.

At the end of robotic arm 302 is a manipulation device 350 that includes an example of manipulation device mount point 150 discussed above. In this example, fingers 304 are connected via mounting brackets 303 to manipulation device 350.

In use, multiple items 305 may be dispersed randomly on work tray 306. For example, a container of items may pour a number of individual items onto work tray 306 and allow them to disperse. In addition to random dispersal at time of arrival of work items onto work tray 306, periodic vibration of work tray 306 may reposition individual work items and separate any groups of items that may be too closely grouped for proper picking by fingers 304.

After dispersal of multiple items 305, camera 307 may determine a relative location of a target item on work tray 306. Processing of an image taken by camera 307 may be performed by a processing device to identify an X-Y coordinate location for the target item. Processing may also determine an initial orientation of the target item (e.g., determine how the item is laying on work tray 306). Upon completion of this pre-pick processing, robotic arm 302 may position manipulation device 350 above the target item and lower over the target item with fingers 304 expanded to position on opposite sides of the target item when the fingers are lowered to be substantially equal to the surface of work tray 306.

At this point, a grasping operation may commence, and the fingers may be clasped together onto the target item. As the fingers close and clamp onto the target item, the intrinsic orientation may take place because, as explained above, an orientation attribute provided by a shape of the grasping end of fingers 304 may interact with the external shape of the target item. This interaction may provide that upon completion of collapsing of fingers 304, the target item is secured by fingers 304 in an at least partially known orientation.

Having picked the item, robotic arm 302 may further orient the item (e.g., perform additional rotational orientation) and place the target item in another location (not shown) where the other location has a pre-defined orientation for the target item. In this manner, apparatus 300 may automatically pick, orient, and sort individual target items until all of work items 305 have been processed.

The shape of work tray 306 may be flat or may include groves, ridges, or other texture to assist in the above disclosed operations. Also, as discussed above, periodic vibration of tilting of work tray 306 may be performed to separate groups of work items 305. After each separation, identification of target work items may be performed again by camera 307 and communicatively coupled processing devices (not shown). Further, to enhance speed of operation, apparatus 300 may include one or more pre-processing or parallel processing tasks. Specifically, a previously obtained image may be processed to identify a precise location of a second target item while apparatus 300 is performing a pick operation on a first target item. Further, if no disruption has been introduced (e.g., no vibration or tilting), apparatus 300 may preprocess for several future target items while processing a first target item.

Figure 4:
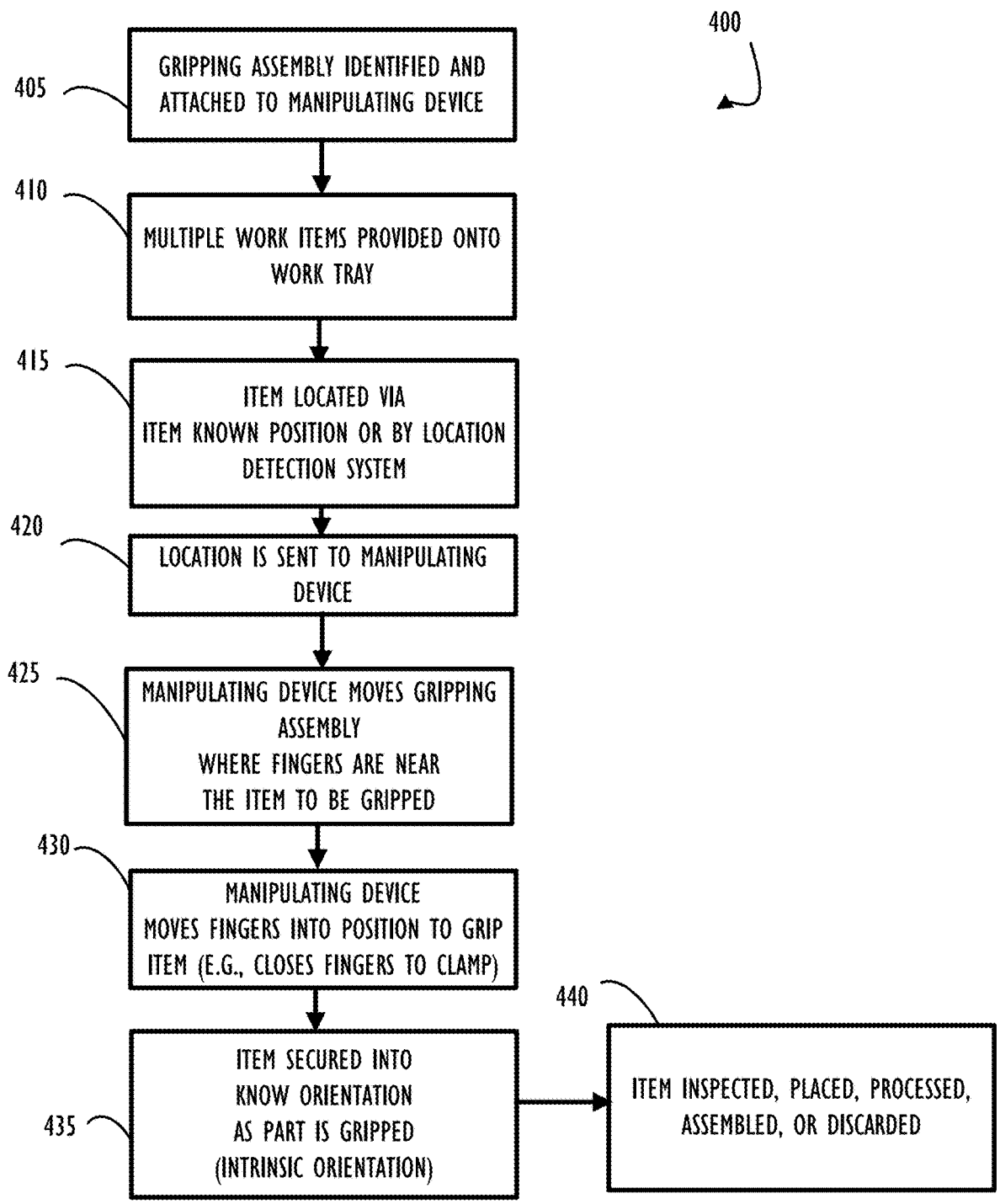
FIG. 4 illustrates a high-level block diagram of a possible workflow for use of the disclosed item gripping assembly, according to one or more disclosed examples.

FIG. 4 illustrates a high-level block diagram of a possible workflow 400 of the Item Gripping Assembly with Intrinsic Item Orienting Attributes, according to one or more disclosed embodiments. Workflow 400 begins at block 405 with the appropriate gripping assembly being selected (e.g., gripping assembly 100 discussed above). Once selected, flow continues to block 410 where the gripping assembly may be attached to a manipulation device via manipulation device mount point 150 discussed above. The selection of an appropriate gripping assembly may include determining which gripping assembly includes a proper shape at the distal ends of respective fingers to properly interact with specific target items that are to be processed during this iteration of workflow 400. As discussed throughout this disclosure, the external shape of target items may differ, and different finger "tips" (e.g., beveled retrieval ends 107A-B from FIG. 1) may be more efficient than others with respect to the orientation attribute provided by fingers as part of the grasping operation.

As illustrated at block 410, to begin a sorting or assembly operation, one or more work items may be "placed" onto a tray such as work tray 306 from FIG. 3. In some cases, a work tray may not be required but a known working surface for picking items may be desirable to improve efficiency and accuracy. Placing of multiple work items may be performed by various means such as "dumping" a small quantity of work items (or larger quantity depending on size of work area) onto the working surface. At block 415, one or more target item locations may then be identified by a location detection system such as a camera and processor as discussed above. The known position may then be provided to the manipulation device at block 420. This known position or location may be provided to a manipulation device by electronic communication, digital signaling, or manual entry.

At block 425, a manipulation device may be moved to a position where its associated fingers are near (e.g., above) the target item to be gripped. At block 430, manipulation device may then close (or clamp) the fingers into a position to grip the target item (e.g., perform a grasping operation). At block 435, the target item is now gripped with a known orientation and can be moved by the manipulation device for inspection, processing, placement, assembly, or discarding as illustrated at block 440. Although block 435 indicates there is a known orientation, it is possible that the specific orientation is only partially known after gripping. In this case, additional processing may be performed by the camera in cooperation with the fingers to determine if further rotation (e.g., rotation by 180 degrees) may be desired.

Figure 5:
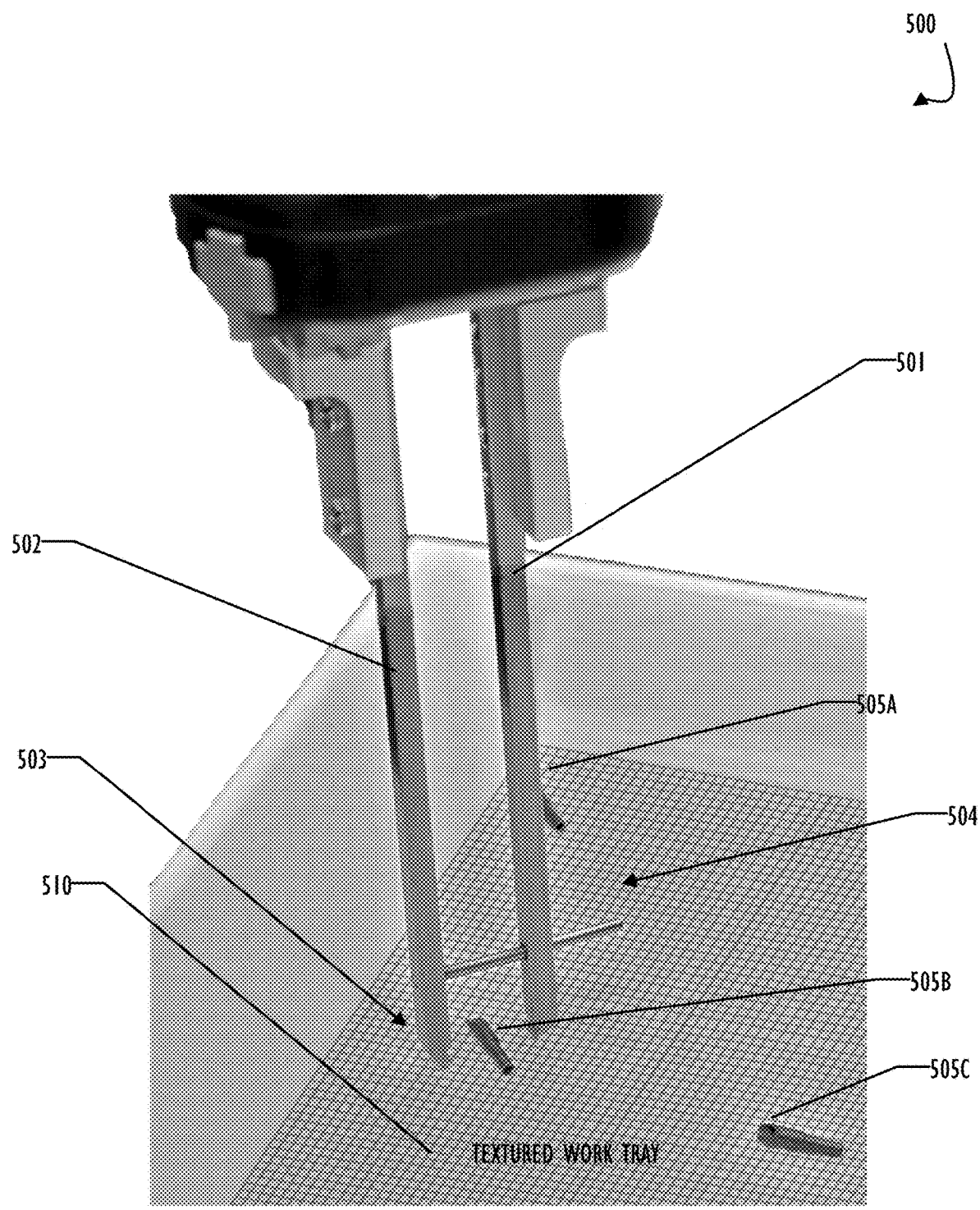
FIG. 5 illustrates an early stage (after alignment but prior to grasp) of an item gripping assembly while in use to perform a "pick" operation on an item (in this example a precision pin), according to one or more disclosed examples.
Figure 6:
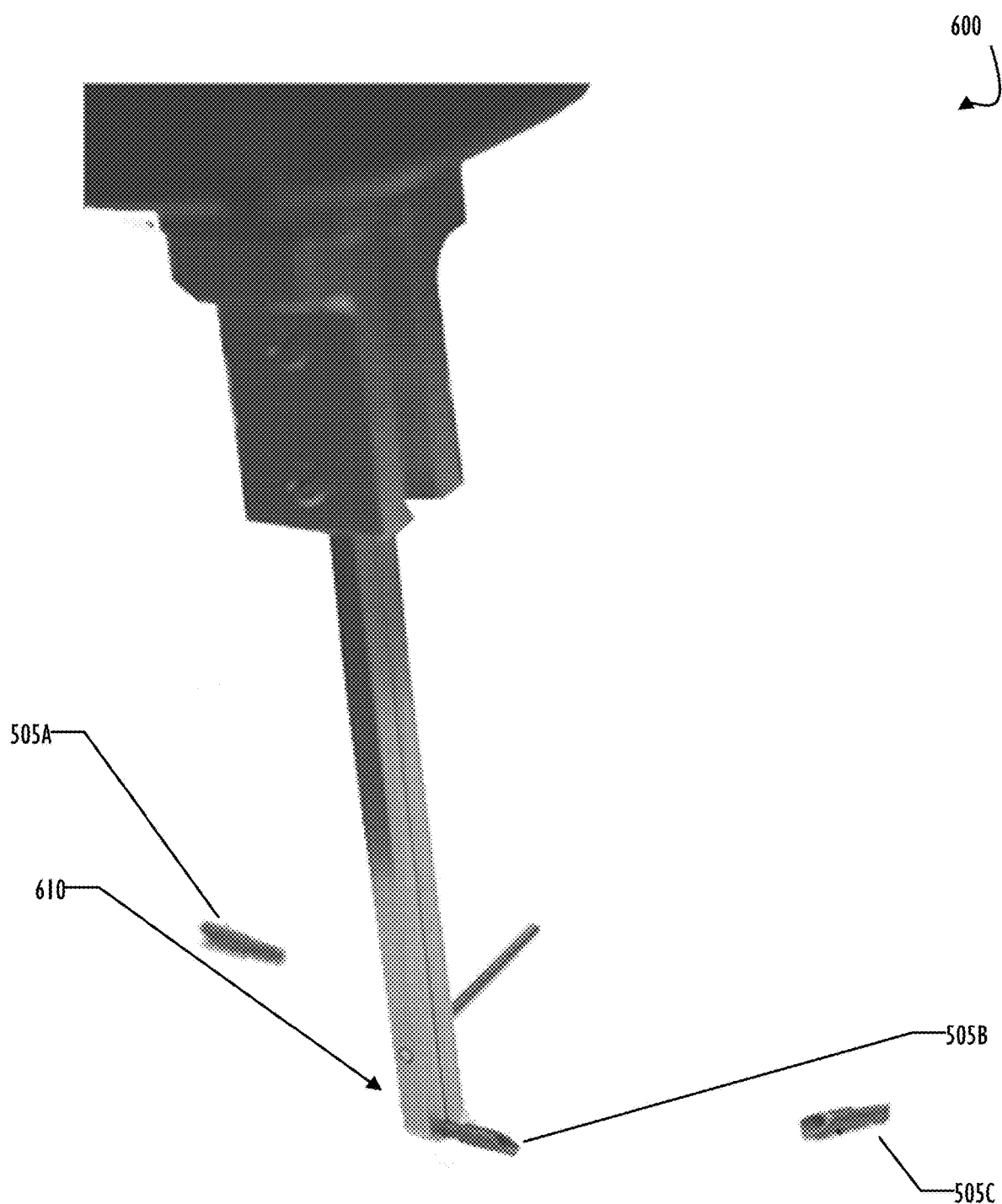
FIG. 6 illustrates a subsequent stage to that of FIG. 5 (after grasp) of an item gripping assembly while in use, according to one or more disclosed examples.

Turning now to FIGS. 5 and 6, FIG. 5 illustrates another possible use of the disclosed gripping assembly 500 (similar to gripping assembly 100 discussed above) for use with a precision pin representing a use of disclosed techniques for small items, according to one or more disclosed embodiments. In this example, a textured mostly flat work tray 510 is illustrated. As briefly explained above, a textured part tray may serve to prevent part movement upon placement of an item on the tray where the tray texture size is particular to the item being placed on the tray.

In this example, three instances of a work item are illustrated as work items 505A, 505B, and 505C. As illustrated, finger 501 and finger 502 are positioned in an open (non-clamped) setting that surrounds target work item 505B. Each of finger 501 and 502 have mirror image retrieval ends 503 that will surround and grasp target work item 505B upon closure of their respective fingers. Also shown is a precision alignment set of components 504 that were discussed in more detail above (See FIG. 1).

As illustrated in the examples of this disclosure, each of a first finger and a second finger may have a complementary aspect as part of their shape. Specifically, the shape of respective retrieval ends of each finger may be complementary to each other while taking into account an external shape of at least a portion of a target work item to be grasped by a specifically configured gripping assembly. In some cases, configuring the gripping assembly includes selection of types of fingers (e.g., based on shape of their retrieval ends) that will be attached to a manipulation device. Selection of the shape of retrieval ends may be determined by a shape of at least a portion of an external surface of the target work item. Specifically, the shape of the portion of the target work item that will be grasped as part of a pick and place operation performed by an implementation of the disclosed gripping assembly. Selection of the shape may include determination of a shape that will be most efficient in performing the intrinsic orientation of the target work item when grasped.

FIG. 6 illustrates the example of FIG. 5 from a different angel and after closure of fingers 501-502 to a clamped position. As illustrated by area 610 in view 600, at the distal ends of closed and clamped fingers 501-502, target work item 505B has been grasped at its narrower end that fits precisely between two fully clamped fingers and conforms to the orifice formed by the distal end of the two fully clamped fingers. Had fingers 501-502 attempted to clamp on the larger end of target work item 505B, they would not have been able to achieve a fully clamped position and gripping assembly could be configured to receive that feedback to determine a different orientation of target work item 505B because the larger end of target work item 505B had been grasped. Note throughout this disclosure a clamping position should not be taken to mean a fully closed position unless otherwise stated.

Alternatively, based on amount of closure of fingers 501-502, it may be determined exactly which end of target work item 505B had been grasped and processing may proceed accordingly. Different actions are possible based on design goals of an actual implementation. It should be noted, that if fingers 501-502 did not have a known size of orifice formed when fully closed, or the closing was not done with precision, the orientation of target work item 505B would not be reliably discernible by the gripping apparatus (i.e., a gripping apparatus not configured as disclosed herein).

Figure 7:
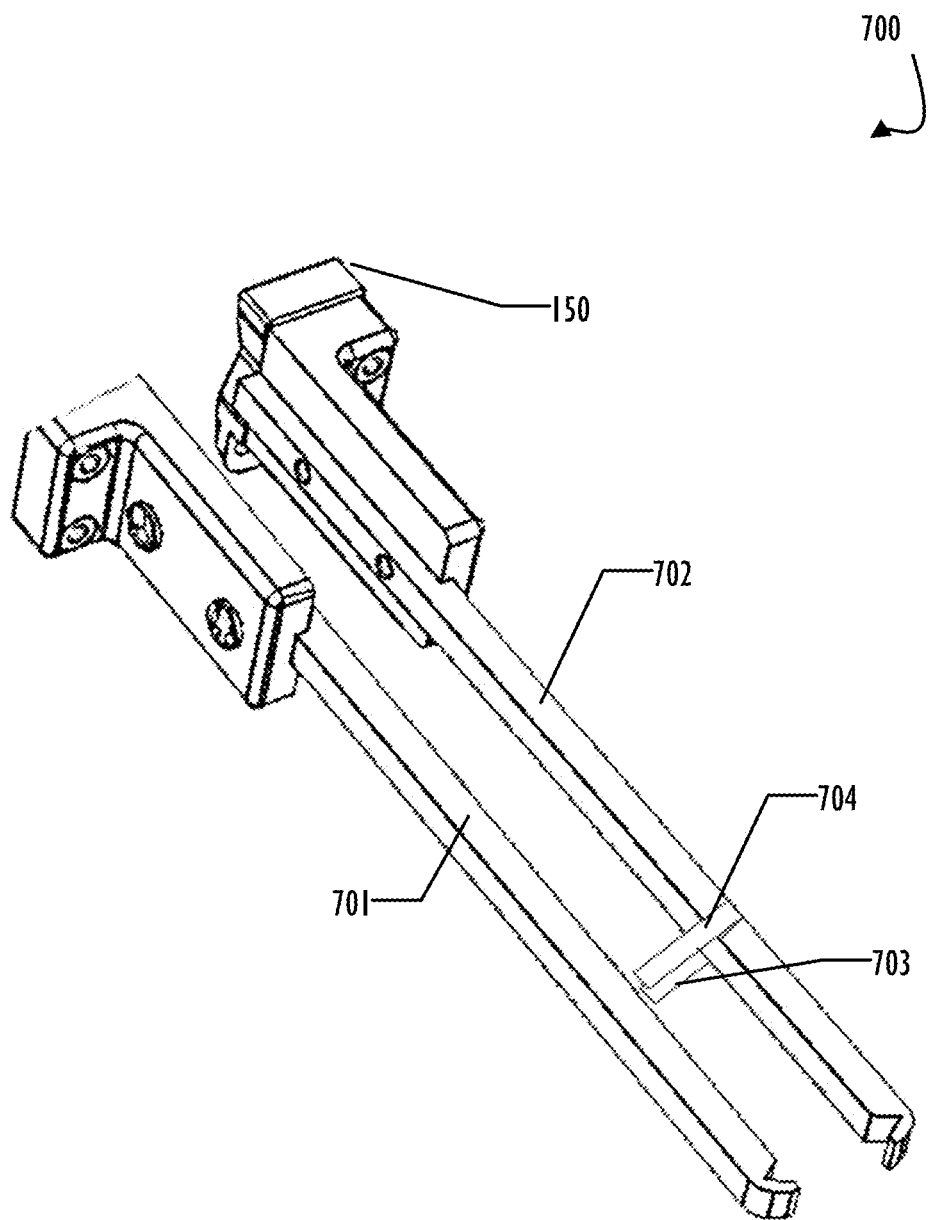
FIG. 7 illustrates an additional example of components for the item gripping assembly as shown in FIG. 1 (e.g., variations on retrieval fingers and alignment tabs), according to one or more disclosed examples.

FIG. 7 illustrates an additional embodiment of an Item Gripping Assembly with Intrinsic Orienting Attributes as gripping assembly 700 that is similar to gripping assembly 100 discussed above. In this example, gripping assembly 700 is mounted to manipulation device mount point 150 and include retrieval fingers 701 and 702 mounted to stabilizing blocks as discussed above. In this example, finger 702 includes optional precision alignment tabs 703 and 704 that would "glide" along the outside of finger 701 and ensure proper precision alignment when fully collapsed into a grasping operation.

Figure 8:
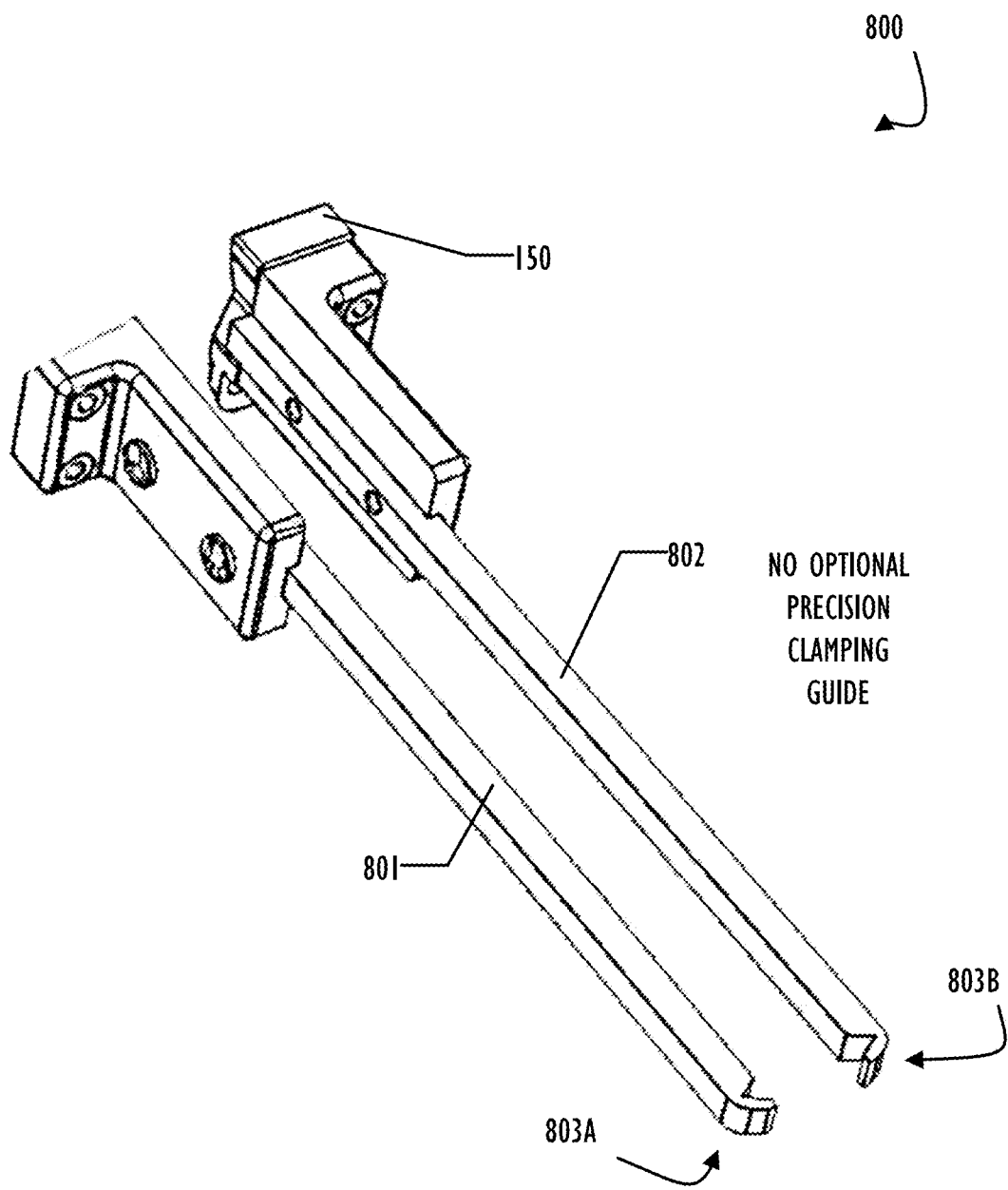
FIG. 8 illustrates an additional example of components for the item gripping assembly as shown in FIGS. 1 and 7 (e.g., variations on retrieval fingers and alignment tabs), according to one or more disclosed examples.

FIG. 8 illustrates an additional embodiment of an Item Gripping Assembly with Intrinsic Orienting Attributes as gripping assembly 800 that is similar to gripping assembly 100 discussed above. In this example, gripping assembly 800 is mounted to manipulation device mount point 150 and include retrieval fingers 801 and 802 mounted to stabilizing blocks as discussed above. In this example, neither of fingers 801 nor 802 include an optional precision clamping device. Fingers 801 and 802 respectively incorporate retrieval ends 803A and 803B.

Figure 9:
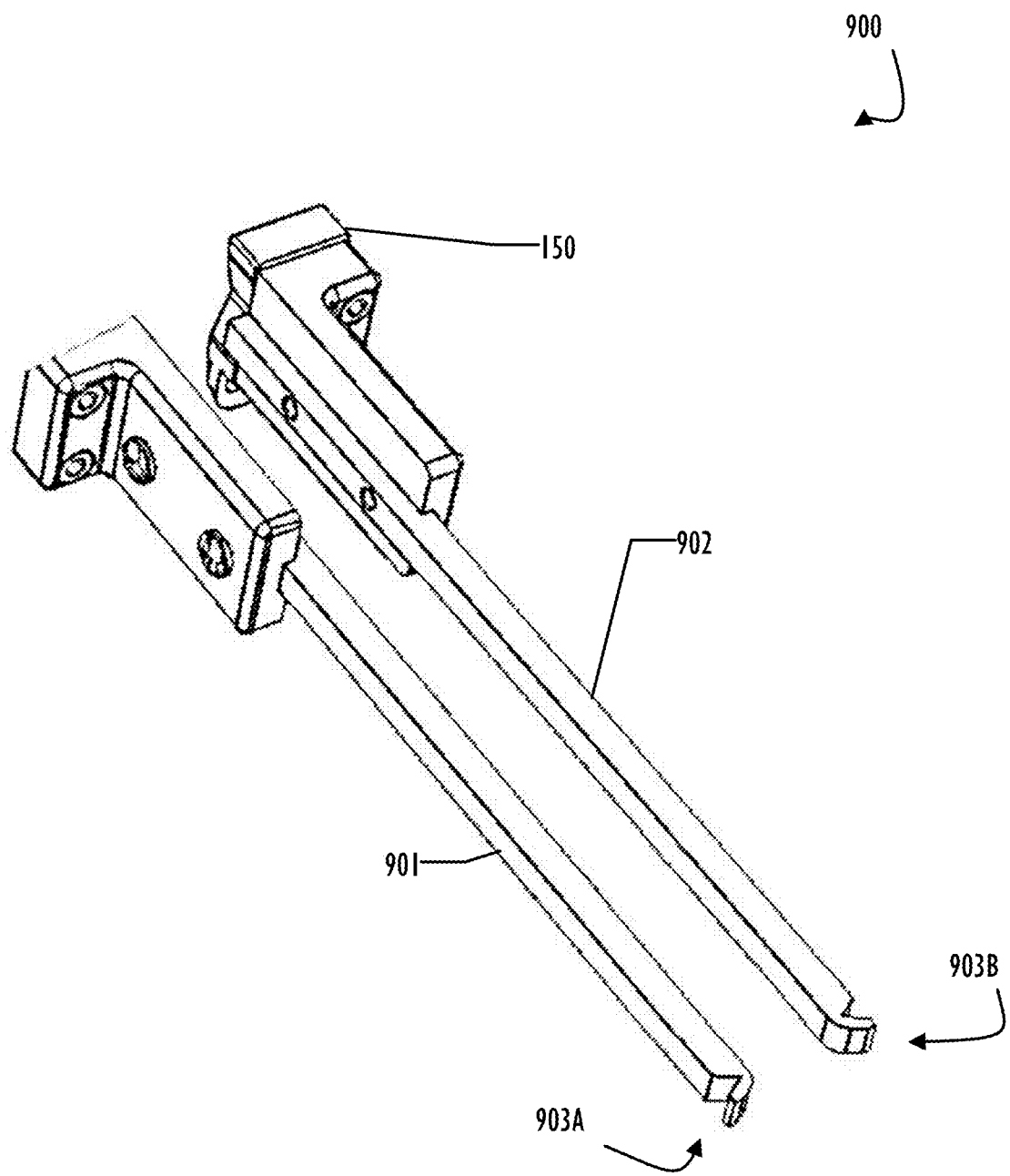
FIG. 9 illustrates an additional example of components for the item gripping assembly as shown in FIGS. 1 and 7-8 (e.g., variations on retrieval fingers and alignment tabs), according to one or more disclosed examples.

FIG. 9 illustrates an additional embodiment of an Item Gripping Assembly with Intrinsic Orienting Attributes as gripping assembly 900 that is similar to gripping assembly 100 discussed above. In this example, gripping assembly 900 is mounted to manipulation device mount point 150 and include retrieval fingers 901 and 902 mounted to stabilizing blocks as discussed above. In this example, fingers 901 and 902 respectively incorporate retrieval ends 903A and 903B. In this example, the retrieval ends are flipped 180 degrees from other implementations. This type of configuration may be useful when picking a work item is performed by spreading the fingers apart as opposed to clamping the fingers together. Other aspects described above may be similarly modified based on this "reversal" of the clamping direction. This arrangement may be used when a work item could be gripped from an interior feature of the work item.

Figure 10:
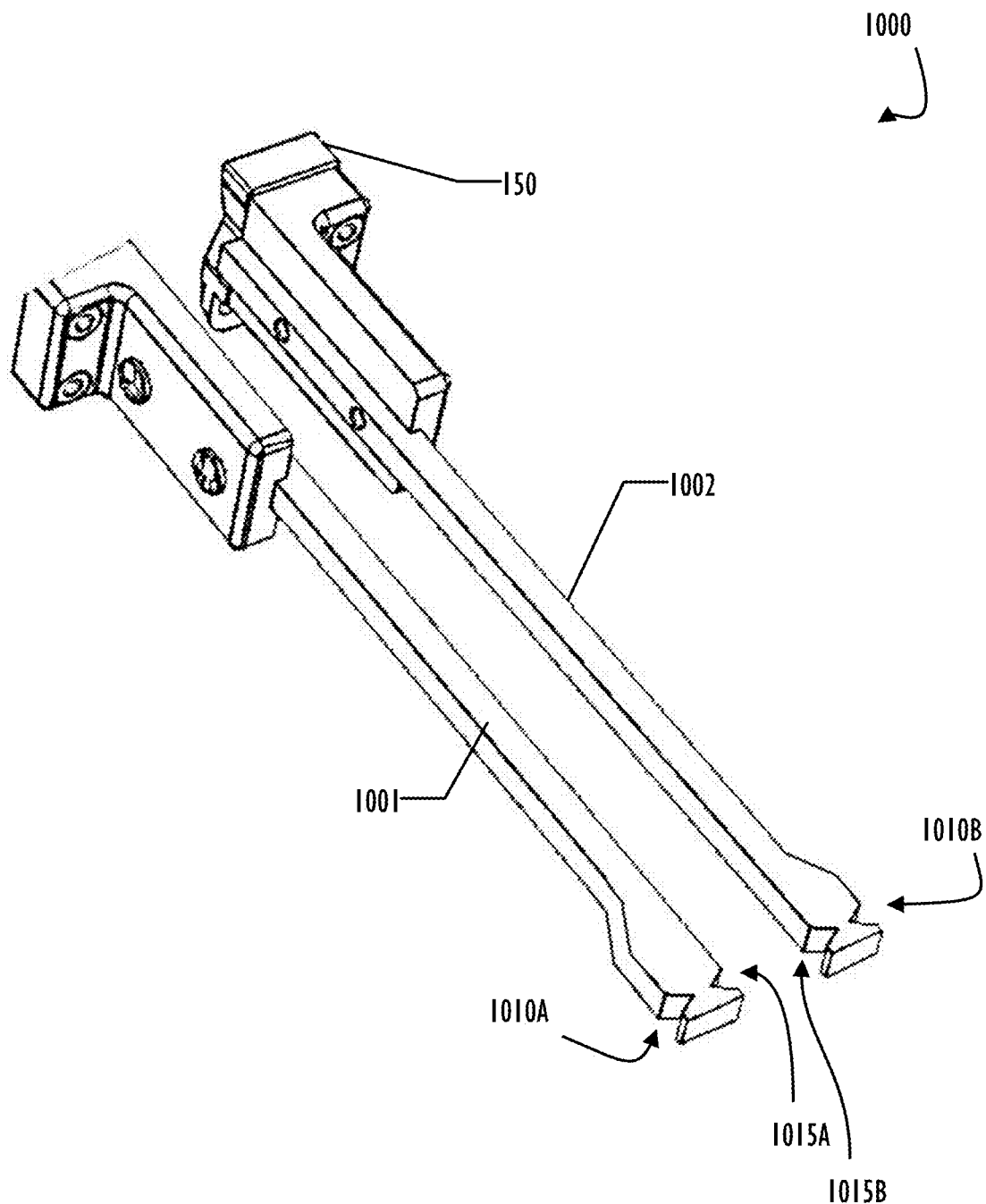
FIG. 10 illustrates an additional example of components for the item gripping assembly as shown in FIGS. 1 and 7-9 (e.g., variations on retrieval fingers and alignment tabs), according to one or more disclosed examples.

FIG. 10 illustrates an additional embodiment of an Item Gripping Assembly with Intrinsic Orienting Attributes as gripping assembly 1000 that is similar to gripping assembly 100 discussed above. In this example, gripping assembly 1000 is mounted to manipulation device mount point 150 and include retrieval fingers 1001 and 1002 mounted to stabilizing blocks as discussed above. In this example, fingers 1001 and 1002 do not include optional precision alignment guides. However, in this example, each retrieval end of finger 1001 and 1002 illustrates a more complex shape design. Specifically, finger 1001 includes two V-notches with a first V-notch 1010A on the outside edge of finger 1001 and V-notch 1015A on the inside edge of finger 1001. Finger 1002 includes a mirror image of finger 1001 that has a first V-notch 10108 and a second V-notch 1015B. These types of fingers may be used to attach to a groove in a work item or may pick different work items by alternating between and inward clamping motion and an outward spreading motion, whichever is appropriate, to obtain a target work item. Some possible items gripped with this configuration would include washers, O-rings, seals, pins, dowels, rods, and bearings, in addition to other items.

Figure 11:
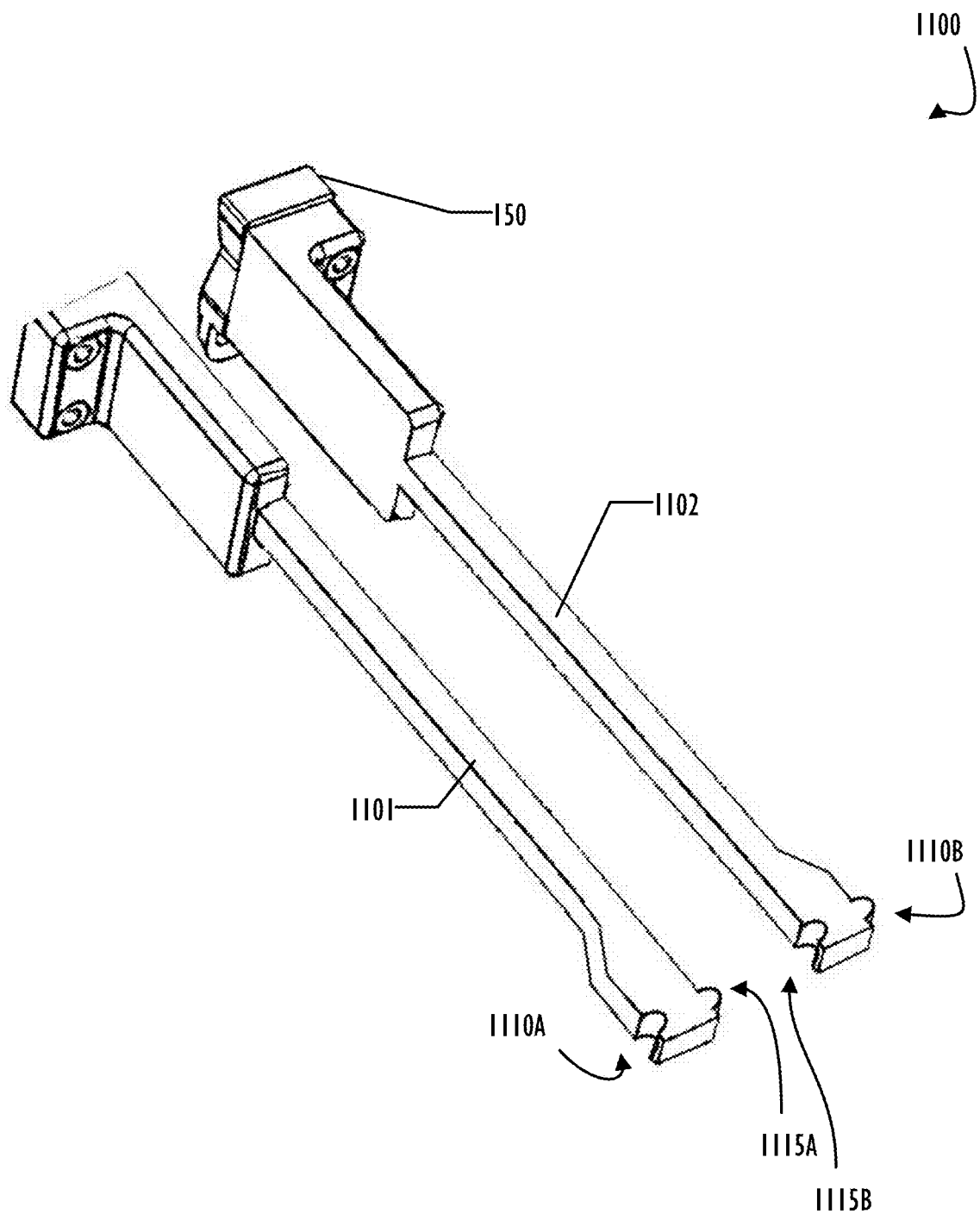
FIG. 11 illustrates an additional example of components for the item gripping assembly as shown in FIGS. 1 and 7-10 (e.g., variations on retrieval fingers and alignment tabs), according to one or more disclosed examples.

FIG. 11 illustrates an additional embodiment of an Item Gripping Assembly with Intrinsic Orienting Attributes as gripping assembly 1100 that is similar to gripping assembly 100 discussed above. In this example, gripping assembly 1100 is mounted to manipulation device mount point 150 and include retrieval fingers 1101 and 1102 mounted directly to manipulation device mount point 150 without use of stabilizing blocks as discussed above. In this example, fingers 1101 and 1102 do not include optional precision alignment guides. However, in this example, each retrieval end of finger 1101 and 1102 illustrates a more complex shape design. Specifically, finger 1101 includes two shapes at its retrieval end with a first U-notch 1110A on the outside edge of finger 1101 and convex protrusion 1115A on the inside edge of finger 1101. Finger 1102 includes a repetition of finger 1101 (i.e., not a mirror orientation) that has a first U-notch 11158 and a second convex protrusion 11108. These types of fingers may be used to attach to a groove in a work item or may pick different work items by alternating between and inward clamping motion and an outward spreading motion, whichever is appropriate, to obtain a target work item.

Figure 12:
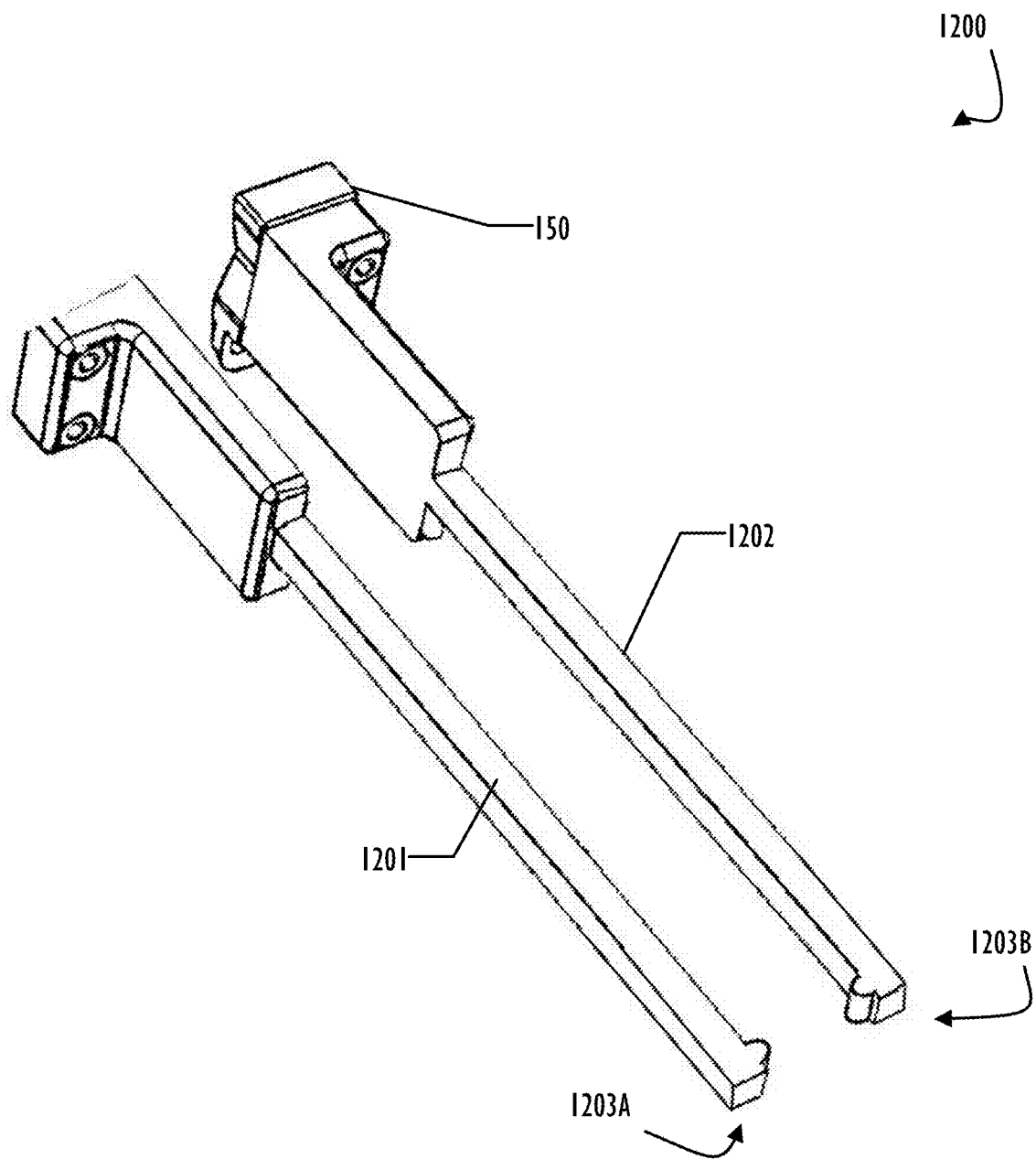
FIG. 12 illustrates an additional example of components for the item gripping assembly as shown in FIGS. 1 and 7-11 (e.g., variations on retrieval fingers and alignment tabs), according to one or more disclosed examples.

FIG. 12 illustrates an additional embodiment of an Item Gripping Assembly with Intrinsic Orienting Attributes as gripping assembly 1200 that is similar to gripping assembly 100 discussed above. In this example, gripping assembly 1200 is mounted to manipulation device mount point 150 and include retrieval fingers 1201 and 1202 mounted directly to manipulation device mount point 150 as discussed above. In this example, fingers 1201 and 1202 respectively incorporate retrieval ends 1203A and 1203B. In this example, the retrieval ends are again mirror images of each other. However, in this example, the retrieval ends 1203A and 12038 do not form an orifice when collapsed together and instead form a point of contact at a precise location. This type of configuration may be useful when picking a work item is performed by attaching to a grove in a target work item, for example. Some possible items gripped with this configuration would include washers, O-rings, seals, and bearings, in addition to other items with interior features.

Figure 13:
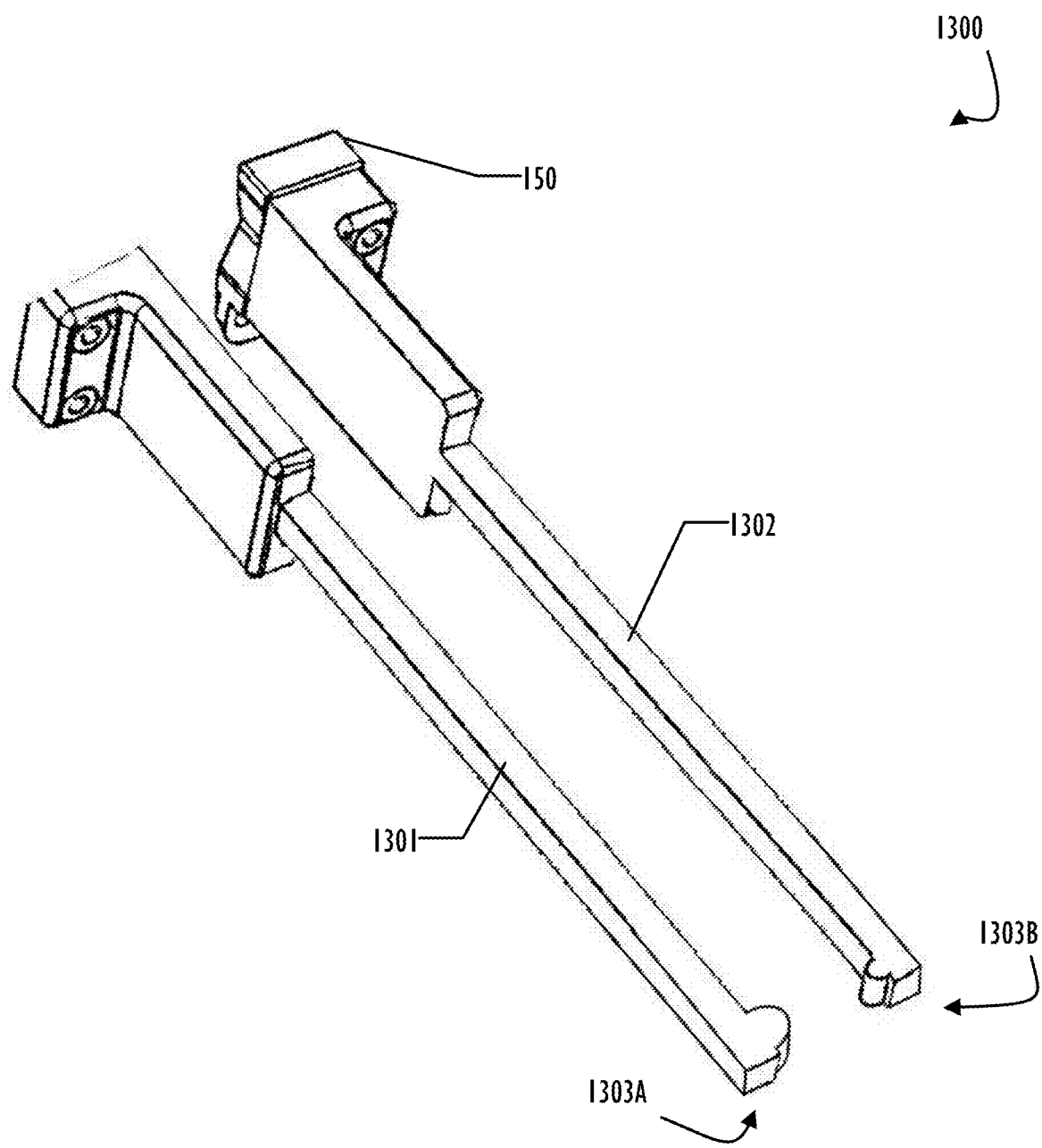
FIG. 13 illustrates an additional example of components for the item gripping assembly as shown in FIGS. 1 and 7-12 (e.g., variations on retrieval fingers and alignment tabs), according to one or more disclosed examples.

FIG. 13 illustrates an additional embodiment of an Item Gripping Assembly with Intrinsic Orienting Attributes as gripping assembly 1300 that is similar to gripping assembly 100 discussed above. In this example, gripping assembly 1300 is mounted to manipulation device mount point 150 and include retrieval fingers 1301 and 1302 mounted directly to manipulation device mount point 150 as discussed above. In this example, fingers 1301 and 1302 respectively incorporate retrieval ends 1303A and 1303B. However, in this example, the retrieval ends 1303A and 1303B do not form an orifice when collapsed together and instead form a point of contact at a precise location. Further, the size of the convex protrusion on retrieval end 1303A is larger than the convex protrusion of retrieval end 13038. This type of configuration may be useful when picking a work item is performed by attaching to an asymmetrical grove in a target work item, for example.

Figure 14:
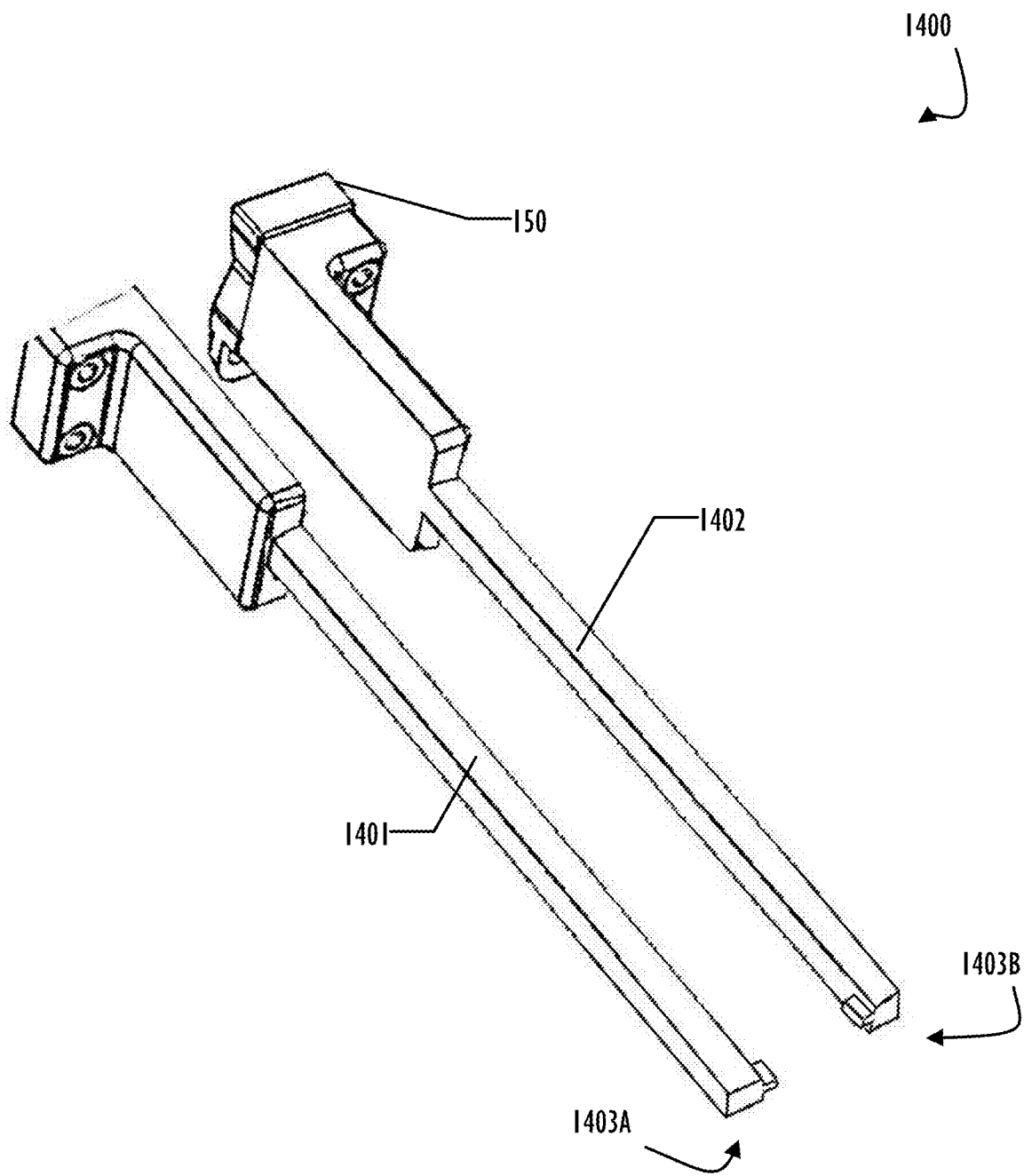
FIG. 14 illustrates an additional example of components for the item gripping assembly as shown in FIGS. 1 and 7-13 (e.g., variations on retrieval fingers and alignment tabs), according to one or more disclosed examples.

FIG. 14 illustrates an additional embodiment of an Item Gripping Assembly with Intrinsic Orienting Attributes as gripping assembly 1400 that is similar to gripping assembly 100 discussed above. In this example, gripping assembly 1400 is mounted to manipulation device mount point 150 and include retrieval fingers 1401 and 1402 mounted directly to manipulation device mount point 150 as discussed above. In this example, fingers 1401 and 1402 respectively incorporate retrieval ends 1403A and 1403B. However, in this example, the retrieval ends 1403A and 1403B do not form an orifice when collapsed together and instead form a point of contact at a precise location. Further, the size and shape of the convex protrusion on retrieval ends 1403A and 1403B would fit into a notch when closed to a clamping position. Note throughout this disclosure a clamping position should not be taken to mean a fully closed position unless otherwise stated. A partially closed clamping position may be desired when working with fingers that include protrusions rather than orifices. The configuration of FIG. 14 may be useful when picking a work item is performed by attaching to a slot in a target work item, for example.

Figure 15:
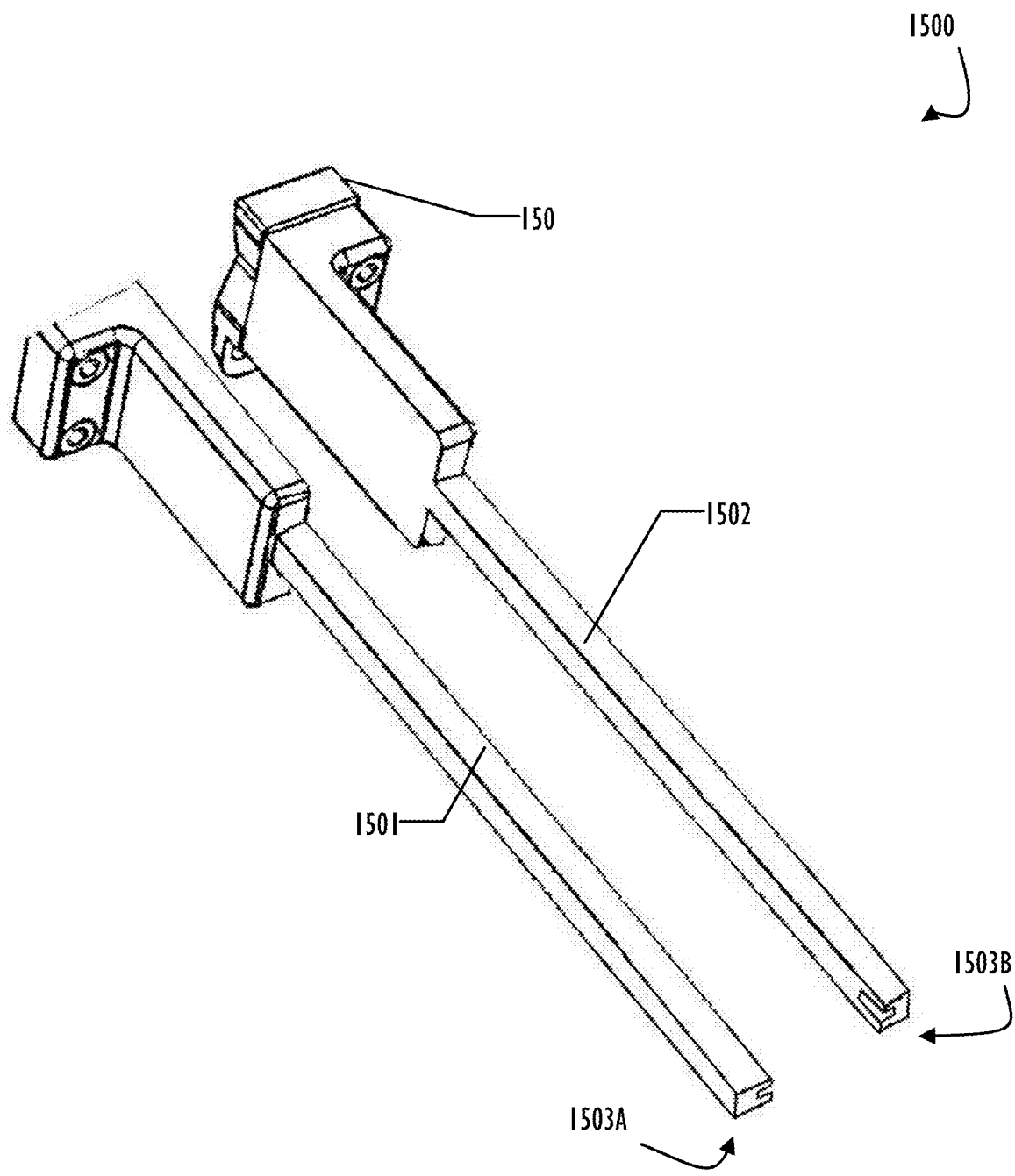
FIG. 15 illustrates an additional example of components for the item gripping assembly as shown in FIGS. 1 and 7-14 (e.g., variations on retrieval fingers and alignment tabs), according to one or more disclosed examples.

FIG. 15 illustrates an additional embodiment of an Item Gripping Assembly with Intrinsic Orienting Attributes as gripping assembly 1500 that is similar to gripping assembly 100 discussed above. In this example, gripping assembly 1500 is mounted to manipulation device mount point 150 and include retrieval fingers 1501 and 1502 mounted directly to manipulation device mount point 150 as discussed above. In this example, fingers 1501 and 1502 respectively incorporate retrieval ends 1503A and 1503B. In this example, the retrieval ends 1503A and 1503B form an orifice when collapsed together. However, the orifice formed by gripping assembly 1500 is different than those discussed above because it has a vertical orientation rather than a horizontal orientation. This type of configuration may be useful when picking a work item is performed by attaching to a peg, handle, or other protrusion from a target work item, for example. A possible item gripped with this configuration would include items with matching external or protruding attributes matching the orienting attribute.

Figure 16:
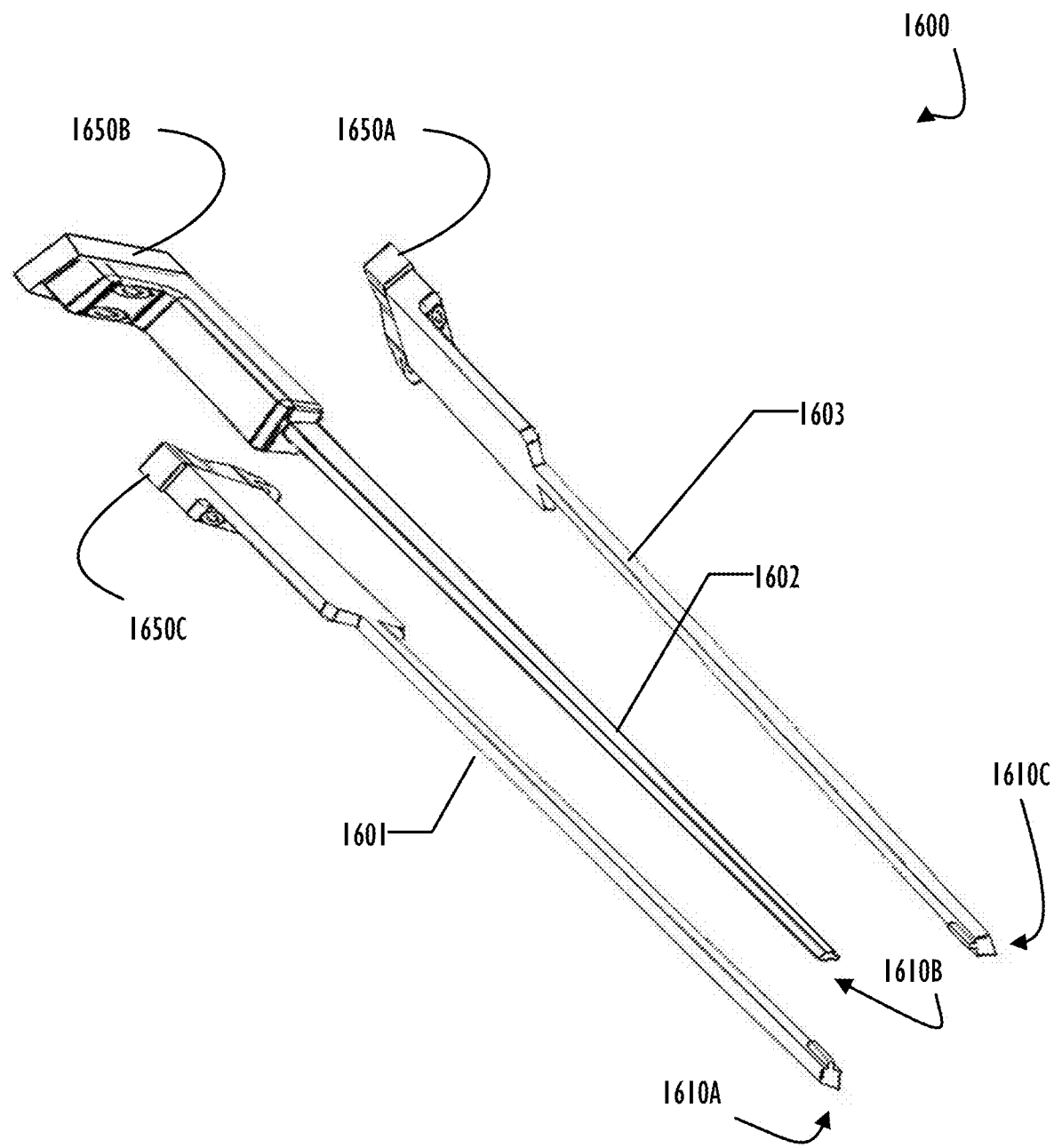
FIG. 16 illustrates an additional example of components for the item gripping assembly as shown in FIGS. 1 and 7-15 (e.g., variations on retrieval fingers and alignment tabs), in this case illustrating three retrieval fingers, according to one or more disclosed examples.

FIG. 16 illustrates an additional embodiment of an Item Gripping Assembly with Intrinsic Orienting Attributes as gripping assembly 1600 that is similar to gripping assembly 100 discussed above. In this example, gripping assembly 1600 is mounted to a manipulation device (not shown) and includes, in this example, three retrieval fingers 1601, 1602, and 1603. In this example, fingers 1601, 1602, and 1603 respectively incorporate retrieval ends 1603A, 1603B, and 1603C. In this example, the retrieval ends 1603A-C include a shape that may be useful when grasping a work item from three directions simultaneously. In some cases, the fingers may close at different rates to allow some fingers to act on the work item prior to engagement of other fingers. This type of configuration may be useful when picking a work item is performed by first pushing or pulling the work item with one finger prior to clamping with the other two (or all three) fingers. Alternatively, all three fingers may move in unison to achieve the desired result. A possible item gripped in this case could be a circular part with matching orienting attributes. This example is of particular value if gripping an item with 2 fingers is either not stable or where the fingers would interfere with placement or inspection of the part. Other possible manipulation devices could have more fingers and varying orientations and varying number of fingers.

Figure 17:
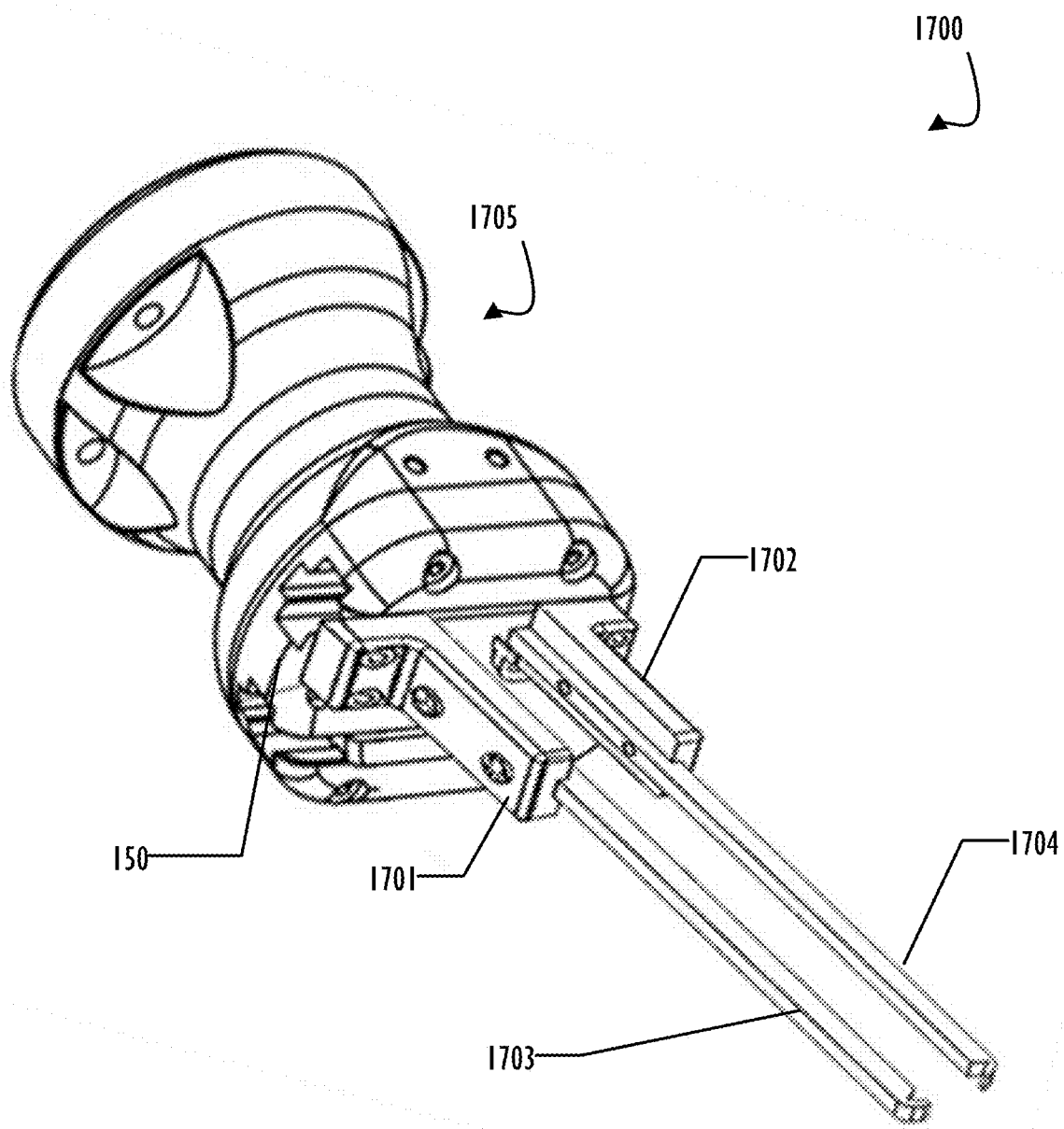
FIG. 17 illustrates an additional example of components for the item gripping assembly as shown in FIGS. 1 and 7-16 (e.g., variations on retrieval fingers and alignment tabs) in which the assembly is mounted to one example manipulation device, according to one or more disclosed examples.

FIG. 17 illustrates another view of connection points between disclosed components of a gripping assembly 1700. In this example, interaction between manipulation device mount point 150 and a mechanical manipulation device 1705 is illustrated. As discussed in the examples above, manipulation device mount point 150 represents the mounting point to a mechanical manipulation device such as manipulation device 1705 (or manipulation device 350 shown at the end of robot arm 302 in FIG. 3). In any case, manipulation device mount point 150 will be acted upon, in the various embodiments, by a manipulation device (e.g., such as manipulation device 1705 in this example) and impart movement to other attached components such as fingers 1703 and 1704 or mounting blocks 1701 and 1702 that are, in turn, attached to fingers. Manipulation device 1705 may represent the end of a robot arm or other automated mechanical device.

In one possible embodiment of this disclosure, items from a bulk non-oriented package are automatically placed. This placement may occur, without precision, within a specific range of placement, such as within a radius of a central point. The central point refers to a central point of a surface with a known height relative to the positioning device.

Once the placement is complete, the positioning and manipulation device may then position the gripping assembly over the item to be retrieved from the surface. The location of the item on the surface may be identified by a real-time imaging device (e.g., an optical device such as a camera).

Knowing the location (via the camera) and positioning the gripping assembly (using manipulation device), a retrieval command may be issued to cause the fingers of the gripping device to close and perform a grasp operation. As explained above, the grasp operation is the instance of clamping on the item as part of the pick operation.

The closing of the fingers initiates the precise retrieval of the target item and the orientation attributes of the fingers function as part of the grasp operation to orient the item within the closed fingers. After a successful pick operation, there is a high degree of assurance that the item is retrieved within the fingers and properly oriented. Having this understanding, the positioning and manipulation device may then process the item with a known position and/or orientation. The processing of the item may include placing the item into another assembly or simply placing the item into a directionally oriented conveyer mechanism for later use in an assembly process.

Several embodiments are disclosed herein. Variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus to perform a pick and place operation for a plurality of randomly oriented work items from a defined work area, the apparatus comprising:
   a processing device;
   a sensor communicatively coupled to the processing device, the sensor to detect information to determine a location of a first target work item, from the plurality of randomly oriented work items, and provide the detected information to the processing device;
   a manipulation device communicatively coupled to the processing device, the manipulation device being movable throughout an X-Y horizontal coordinate space above the defined work area; and
   a gripping assembly attached to the manipulation device and including a first finger and a second finger, each of the first finger and the second finger including an orientation attribute as part of a retrieval end for each respective finger, the orientation attribute of the first finger having a complementary aspect to the orientation attribute of the second finger with respect to grasping the first target work item from the defined work area, the complementary aspect taking into account an external shape of a pre-defined portion of the first target work item, wherein the complementary aspect provides intrinsic orientation of the first target work item while moving each of the first finger and the second finger toward the pre-defined portion of the first target work item as part of a grasping operation for the first target work item by the gripping assembly,
   wherein:
      at least one of the first finger or the second finger include a precision guide component to create a change in tolerance of alignment during the grasping operation;
      the first finger includes a precision guide hole as part of the precision guide component and the second finger includes a precision guide pin to pass through the precision guide hole during the grasping operation; and
      at least one of the precision guide hole or the precision guide pin are tapered to create a change in tolerance of alignment during the grasping operation.

2. The apparatus of claim 1, further comprising a mounting bracket, wherein at least a portion of the gripping assembly mounts to the manipulation device using the mounting bracket, the mounting bracket providing a stabilizing effect to at least one of the first finger or the second finger.

3. The apparatus of claim 2, wherein at least one of the first finger or second finger are attached to the mounting bracket to provide an indirect connection to the manipulation device.

4. The apparatus of claim 2, wherein the mounting bracket includes a precision guide component to cause alignment of each of the first finger and the second finger while moving as part of the grasping operation.

5. The apparatus of claim 1, wherein the precision guide component further comprises at least one tab on the first finger to create alignment during the grasping operation via contact with an external surface of the second finger.

6. The apparatus of claim 1, wherein grasping the first target work item from the defined work area comprises moving the first finger and the second finger toward each other.

7. The apparatus of claim 1, wherein grasping the first target work item from the defined work area comprises moving the first finger and the second finger away from each other.

8. The apparatus of claim 1, wherein the gripping assembly further comprises a third finger to operate in coordination with the first finger and the second finger during the grasping operation.

9. The apparatus of claim 1, wherein the defined work area is at least a portion of a work tray upon which the plurality of randomly oriented work items is distributed.

10. The apparatus of claim 9, wherein the work tray includes a textured surface to reduce movement of the plurality of randomly oriented work items.

11. The apparatus of claim 9 further comprising a vibration device to periodically vibrate the work tray.

12. The apparatus of claim 1, wherein the sensor includes 2D/3D Vision, laser, camera, optical sensor, or work tray grid detection system to collect the detected information.

13. The apparatus of claim 1, further comprising a robot arm to provide movement of the manipulation device throughout the X-Y coordinate space and through a Z vertical coordinate relative to the defined work area.

14. The apparatus of claim 1, wherein the processing device is configured to perform an inspection of the target work item after performing the grasping operation and prior to performing a place operation.

15. The apparatus of claim 14, wherein upon failure of the performed inspection, the target work item is prohibited from proceeding through a sorting or assembly process.

16. The apparatus of claim 1, wherein the complementary aspect of the first finger to the second finger is represented by shapes of retrieval ends of respective fingers that form an orifice to match the external shape of to the pre-defined portion of the first target work item.

17. The apparatus of claim 1, wherein the complementary aspect of the first finger to the second finger is represented by shapes of retrieval ends of respective fingers that fill an opening associated with the external shape of to the pre-defined portion of the first target work item.

* * * * *